United States Patent [19]

Eriksson et al.

[11] 4,034,936
[45] July 12, 1977

[54] DEVICE FOR DAMPING THE TIPPING AND YAWING OSCILLATIONS OF THE GUIDANCE SYSTEM OF A FLYING VEHICLE

[75] Inventors: Sven Willner Eriksson, Karlskoga; Bengt Gustaf Lövung, Kallered; Hans Manne A. Salomonsson; Rolf Hilding Sandlin, both of Karlskoga, all of Sweden

[73] Assignee: AB Bofors, Bofors, Sweden

[21] Appl. No.: 643,989

[22] Filed: Dec. 24, 1975

[51] Int. Cl.² .......................................... F41G 7/00
[52] U.S. Cl. ................................ 244/3.15; 244/184
[58] Field of Search .......... 318/584, 586; 244/3.15, 244/3.21, 184, 175, 189

[56] References Cited

U.S. PATENT DOCUMENTS

| | | | |
|---|---|---|---|
| 2,632,142 | 3/1953 | Chenery | 318/586 |
| 3,073,553 | 1/1963 | Colemann et al. | 244/184 |
| 3,140,482 | 7/1964 | Duncan et al. | 244/3.15 |
| 3,331,951 | 7/1967 | Webb | 244/175 |
| 3,773,281 | 10/1973 | Doniger et al. | 244/184 |

OTHER PUBLICATIONS

Introduction to Operational Amplifier Theory and Applications, Wait et al. (5/2/75) pp. 282–284, 286.
Guidebook of Electronic Circuits, Markus (1974), p. 264.

Primary Examiner—Samuel W. Engle
Assistant Examiner—S. A. Cangialosi
Attorney, Agent, or Firm—Pollock, Vande Sande & Priddy

[57] ABSTRACT

The guidance system for a flying vehicle having at least one guidance channel for converting an error signal to a command signal for a control surface servo of the vehicle includes means for damping oscillations at the natural frequency of the vehicle. A damping means includes a notch filter in the guidance channel which serves to damp oscillations at the notch frequency. The notch frequency is controlled and conformed to the natural frequency of the vehicle, as the natural frequency of the vehicle varies with vehicle speed, by providing the notch filter with a signal related to vehicle speed. The notch filter is arranged to vary the notch frequency in accordance with the signal provided thereto.

4 Claims, 2 Drawing Figures

DEVICE FOR DAMPING THE TIPPING AND YAWING OSCILLATIONS OF THE GUIDANCE SYSTEM OF A FLYING VEHICLE

FIELD OF THE INVENTION

The present invention relates to a device for damping the tipping and yawing ascillations of the guidance system of a flying vehicle.

BACKGROUND

The invention is particularly intended for use in a missile, whose guidance system of which comprises guidance channels for guidance of the vehicle vertically and horizontally (tipping and yawing, respectively). A vertical or horizontal error position signal is converted into an elevator or side rudder command, respectively, and provided to the control surface servos of the vehicle.

When guiding a flying vehicle, for instance a missile, it is known to guide the missile vertically and horizontally by means of an error position signal, from for instance a computer. The signal is being converted into a control surface command to the control surface servos of the missile. In order to reduce the tracking error of the system, various circuits are then provided in the guidance system to compensate for various sources of disturbances that influence the missile, and for increasing the stability. One of the properties of the missile at tipping and yawing oscillations is that it normally has low damping, and this must usually be increased by synthetic means if the missile is to be guided. The conventional method of increasing this damping is to measure the angular velocity or the transversal accelerations of the vehicle, and from these values calculate a control surface contribution that has a damping effect on the vehicle (active method).

With this technique the band width of the control surface servos must be substantially higher than the natural frequency of the missile; which in certain applications can give unnecessarily high power requirements. It can, for instance, be necessary to use hydraulic motors instead of electric motors, resulting in a higher weight, price and complexity, even for small missiles.

SUMMARY

The purpose of the present invention is to achieve a device to eliminate these disadvantages. The invention is thus mainly characterized in that the guidance channels are provided with notch filters which have the property that they damp oscillations in a narrow band around the notch frequency, this frequency then being arranged to be controlled so that it is in close conformity to the natural frequency of the vehicle (passive method). The influence of the low natural damping of the vehicle is thereby reduced, so that satisfactory properties of the guidance system are obtained.

BRIEF DESCRIPTION OF THE DRAWINGS

A preferred embodiment of the invention will be described in more detail in the following, with reference to the accompanying drawings, in which.

DETAILED DESCRIPTION

Figure 1:
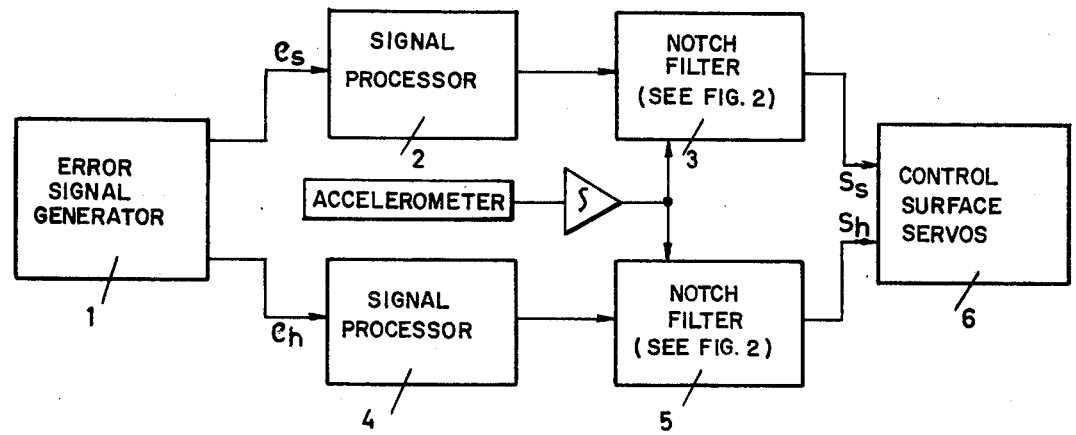
FIG. 1 shows a block diagram of the guidance apparatus of the vehicle and FIG. 2 shows a circuit diagram of a preferred embodiment of the notch filter.

For guidance of a flying vehicle, particularly a missile, two different guidance channels are used, one guidance channel 2, 3 for guidance of the missile horizontally (yawing) and one guidance channel 4, 5 for guidance of the missile vertically (tipping), see FIG. 1. The guidance channels influence the missile via a number of control surface servos 6. Since the invention deals with how the signals that control the servos are produced, rather than the specific arrangement of control surfaces and related servos, the servos are illustrated in block diagram form. The guidance system of the missile also includes a computer 1 for computing the error position of the missile vertically and horizontally. In dependence on the values computed, an error signal horizontally $e_s$ and an error signal vertically $e_h$ are emitted, which error signals are transmitted to the respective guidance channels. The error signals are converted by signal processing devices 2, 4 in the respective channels into control signals, which after filtering (see below) are transmitted to the control surface servos 6.

Figure 2:
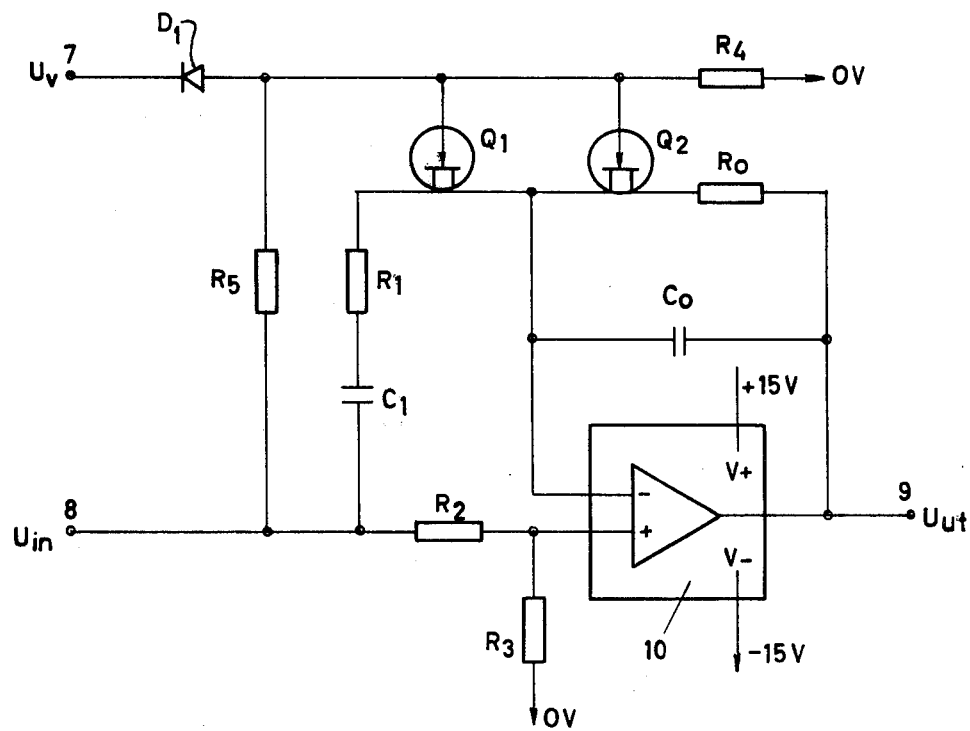

The signal processing devices 2, 4 comprise different units, which are known, to give the guidance channel the desired technical characteristic as regards stability and damping, for adaptation or amplification, to filter out noise and disturbances etc. One of the aerodynamic properties of the missile as regards tipping and yawing is that it has poor damping of the natural frequency, which varies with the speed of the missile. In order to compensate for this, the guidance channels have been provided with notch filters 3, 5 which have the property of damping the oscillations in a narrow band around the notch frequency. By controlling this frequency so that it is in close conformity with the natural frequency of the missile, a damping effect is obtained in the guidance circuit for oscillations near or at the natural frequency. The control surface servos will therefore not be fed with signals of natural frequency, which improves the properties of the missile. Since the natural frequency of the missile varies with the speed, the notch frequency must also be controlled so that it varies with the speed of the missile. It is therefore necessary to measure the speed of the missile. This can be achieved by integrating the signal from an accelerometer which measures the longitudinal acceleration and the retardation. This signal is then amplified and converted by pulse forming circuits into a time dependent signal $^uv$ in the form of a pulse train, which is fed to the control input 7 of the notch filter a preferred embodiment of which is illustrated in FIG. 2.

The pulse train $^uv$ then consists of a number of negative pulses, the width of which depends upon the speed of the missile. In addition to the input 7 for the time dependent signal which is dependent on the speed, the notch filter also has an input 8 for the control signal of the missile. This input 8 is the control signal which is the output of the processing devices 2, 4. This signal is fed via a voltage divider ($R_2$, $R_3$) to the positive input of an operational amplifier 10 which, in turn, emits a signal at the output 9 of the notch filter. The control signal of the missile is also fed via a capacitor $C_1$ in series with a resistor $R_1$ to the negative input of the operational amplifier 10. The operational amplifier also comprises a feedback branch, comprising a capacitor $C_o$ connected in parallel with a resistor $R_o$. Both the connection to the negative input of the operational amplifier 10 and the feedback branch comprise a field effect transistor ($Q_1$ and $Q_2$ respectively) both of which are controlled by the signal $U_v$, which is dependent on vehicle speed, through the input 7 via a diode D 1. The input 7 is also connected via a resistor $R_4$ to earth and via the resistor $R_5$ to the input 8. If the signal on the input 8 designated $U_{in}$ and the signal on the output 9 is designated $U_{ut}$ we obtain $$U_{ut} = a \cdot U_{in} - \frac{(U_{in} - a \cdot U_{in}) \cdot R_o}{\left(R_1 + \frac{1}{sC_1}\right)(1 + sR_oC_o)}$$

in which $a$ is the voltage division and $s$ represents the LaPlace operator. The transmission function of the filter can then be written $$\frac{U_{ut}}{U_{in}} = a \cdot \frac{s^2 + 2\delta_T \cdot \omega_N \cdot s + \omega_N^2}{s^2 + 2\delta_N \cdot \omega_N \cdot s + \omega_N^2}$$

in which $$\omega_N = \sqrt{\frac{1}{R_o R_1 C_o C_1}}$$

constitutes the notch frequency and $\delta_T$ and $\delta_N$ the natural damping of the notch filter. $\delta_T$ is then set equal to the natural damping of the vehicle (usually $\approx 0.1$) and $\delta_N$ set equal to the resulting damping desired (usually $\approx 0.5-1.0$). From the equation above it will be noted that a damping effect is obtained on the output signal on or in the vicinity of the notch frequency. From the equation it will also be noted that by choosing appropriate values of $R_o$, $R_1$, $C_o$ and $C_1$ the notch frequency can be made to conform to the natural frequency of the missile.

In order to be able to vary the notch frequency with the speed of the missile, the two field effect transistors $Q_1$ and $Q_2$ are controlled by the above-mentioned control signal which is dependent on the speed in such a way that the negative pulses which pass the diode D 1 choke the field effect transistors. The relation between the conducting and non-conducting condition of the field effect transistors depends upon the pulse width of the negative pulses which, in turn, depend upon the speed of the missile. The invention is not limited to the embodiment shown above as an example, but can be subject to modifications within the scope of the following claims.

We claim:

1. A guidance system for a flying vehicle including at least one guidance channel for converting an error signal to a command signal for a control surface servo of said vehicle, the improvement comprising means for damping oscillations in said channel in a narrow band at the natural frequency of the vehicle as the natural frequency varies as a function of vehicle speed, said means including:
a notch filter in said channel, said notch filter having a controllable notch frequency and means for controlling the notch frequency of said filter to conform to the natural frequency of the vehicle,
means providing a time-dependent signal varying with the speed of the missile, said time-dependent signal coupled to a control input of said notch filter to control the notch frequency.

2. The device of claim 1 including:
an accelerometer, means integrating the output of said accelerometer, the output of said integrator comprising said time-dependent signal coupled to said control input of said notch filter.

3. The device of claim 2 in which said notch filter comprises:
an operational amplifier having an input, a voltage divider coupling a positive input of said operational amplifier in said guidance channel and a series resistor and capacitor coupling said guidance channel to a negative input of said operational amplifier, a feedback branch comprising a capacitor in parallel with a resistor connected between the output of said operational amplifier and said negative input.

4. The device of claim 3 in which said control input of said notch filter is connected to a pair of field effect transistors, a first of said field effect transistors connected in said feedback branch, and a second of said field effect transistors connected between said series resistor and capacitor and said negative input terminal of said operational amplifier.

* * * * *